US008650805B1

(12) United States Patent
Poleshuk et al.

(10) Patent No.: US 8,650,805 B1
(45) Date of Patent: Feb. 18, 2014

(54) SYSTEMS AND METHODS FOR DMARC IN A CAGE MESH DESIGN

(75) Inventors: Michael Poleshuk, Leonia, NJ (US); Anthony Sclafani, Jackson, NJ (US); Lany Widjaja, Hayward, CA (US)

(73) Assignee: Equinix, Inc., Redwood City, CA (US)

( * ) Notice: Subject to any disclaimer, the term of this patent is extended or adjusted under 35 U.S.C. 154(b) by 522 days.

(21) Appl. No.: 12/876,911

(22) Filed: Sep. 7, 2010

Related U.S. Application Data

(60) Provisional application No. 61/345,445, filed on May 17, 2010.

(51) Int. Cl.
*E04B 2/74* (2006.01)

(52) U.S. Cl.
USPC ........ 52/36.5; 52/676; 52/745.09; 312/223.6; 312/242

(58) Field of Classification Search
USPC ............. 52/36.1, 36.4, 36.5, 36.6, 79.7, 79.8, 52/106, 670, 676, 745.01, 745.05, 745.09, 52/745.15, 745.16; 312/223.1, 223.2, 312/223.3, 223.6, 242; 361/600, 601, 602, 361/614, 672, 724, 725; 174/50
See application file for complete search history.

(56) References Cited

U.S. PATENT DOCUMENTS

| | | | | |
|---|---|---|---|---|
| 1,224,766 A | * | 5/1917 | Martin et al. ................ | 232/41 A |
| 3,839,834 A | * | 10/1974 | Goddard ...................... | 52/238.1 |
| 4,024,729 A | * | 5/1977 | Abate, Sr. et al. ............. | 62/263 |
| 4,559,410 A | * | 12/1985 | Hostetter ..................... | 174/497 |
| 4,631,881 A | * | 12/1986 | Charman ..................... | 52/220.7 |
| 4,689,610 A | | 8/1987 | Dietrich | |
| 4,794,744 A | * | 1/1989 | Young et al. .................... | 256/24 |
| 5,517,185 A | | 5/1996 | Acimovic et al. | |
| 5,541,585 A | | 7/1996 | Duhame et al. | |
| 5,568,362 A | * | 10/1996 | Hansson ....................... | 361/736 |
| 5,715,633 A | * | 2/1998 | Raz et al. ..................... | 52/220.7 |
| 5,778,612 A | * | 7/1998 | Kissinger et al. ............... | 52/205 |
| 5,903,225 A | | 5/1999 | Schmitt et al. | |
| 5,915,973 A | | 6/1999 | Hoehn-Saric et al. | |
| 6,019,321 A | * | 2/2000 | Carlson et al. ................. | 248/49 |
| 6,097,429 A | | 8/2000 | Seeley et al. | |
| 6,101,773 A | * | 8/2000 | Chau et al. ................... | 52/220.7 |
| 6,151,629 A | | 11/2000 | Trewitt | |
| 6,151,852 A | * | 11/2000 | Linn et al. ...................... | 52/239 |

(Continued)

OTHER PUBLICATIONS

TRANE, Tracer Summit, Building Automation System, BAS-PRC0001-EN, Aug. 2003, 20 pages.

(Continued)

*Primary Examiner* — William Gilbert
*Assistant Examiner* — Theodore Adamos
(74) *Attorney, Agent, or Firm* — Rutan & Tucker, LLP

(57) ABSTRACT

A method, apparatus, and system in which a demarcation point cabinet to provide network connectivity between networks is placed into a cage mesh panel design for a communication facility structure, wherein the demarcation point comprises a demarcation point cabinet placed in the non-moving, stationary portion of the cage mesh panel design for the communication facility structure, such as an Internet Exchange (IX), Peering Point, Data Center, or Co-location center, providing security to the customers using the communication facility structure, frees up square footage space inside the cage for customers to put their own equipment and wiring, and adds security because demarcation point cabinet is constructed with physical barriers to prevent physical tampering or access from a front side of the demarcation point cabinet to the back side of the demarcation point cabinet.

20 Claims, 6 Drawing Sheets

(56) References Cited

U.S. PATENT DOCUMENTS

| | | | |
|---|---|---|---|
| 6,160,903 | A | 12/2000 | Hamid et al. |
| 6,281,790 | B1 | 8/2001 | Kimmel et al. |
| 6,353,853 | B1 | 3/2002 | Gravlin |
| 6,364,439 | B1 * | 4/2002 | Cedillo .................... 312/223.6 |
| 6,370,582 | B1 | 4/2002 | Lim et al. |
| 6,389,454 | B1 | 5/2002 | Ralston et al. |
| 6,415,552 | B1 * | 7/2002 | Khosropour .................... 52/27 |
| 6,477,434 | B1 | 11/2002 | Wewalaarachchi et al. |
| 6,496,595 | B1 | 12/2002 | Puchek et al. |
| 6,515,224 | B1 | 2/2003 | Pedro |
| 6,591,242 | B1 | 7/2003 | Karp et al. |
| 6,603,660 | B1 * | 8/2003 | Ehn et al. .................... 361/694 |
| 6,603,758 | B1 | 8/2003 | Schmuelling et al. |
| 6,614,450 | B1 | 9/2003 | Vossler |
| 6,665,702 | B1 | 12/2003 | Zisapel et al. |
| 6,786,014 | B2 * | 9/2004 | Kishimoto et al. .......... 52/220.7 |
| 6,912,567 | B1 | 6/2005 | Allard et al. |
| 6,967,575 | B1 * | 11/2005 | Dohrmann et al. ........ 340/568.1 |
| 6,971,029 | B1 | 11/2005 | Avery et al. |
| 6,976,269 | B1 | 12/2005 | Avery et al. |
| 6,976,296 | B2 | 12/2005 | Boudreault |
| 6,981,026 | B2 | 12/2005 | Noda et al. |
| 6,985,963 | B1 | 1/2006 | Johnson et al. |
| 7,139,728 | B2 | 11/2006 | Rigole |
| 7,167,987 | B2 * | 1/2007 | Angelo .................... 713/186 |
| 7,577,154 | B1 | 8/2009 | Yung |
| 7,715,175 | B2 * | 5/2010 | De La Fuente .............. 361/602 |
| 7,724,507 | B2 * | 5/2010 | Whitt et al. .............. 361/679.04 |
| 7,815,065 | B2 * | 10/2010 | Gosche .................... 220/4.02 |
| 7,891,108 | B1 * | 2/2011 | Cordobes .................... 33/528 |
| 8,091,969 | B2 * | 1/2012 | Caveney et al. .............. 312/248 |
| 8,186,108 | B1 * | 5/2012 | Culpepper .................... 52/27 |
| 2001/0034704 | A1 | 10/2001 | Farhat et al. |
| 2002/0010915 | A1 | 1/2002 | Maeda |
| 2002/0019786 | A1 | 2/2002 | Gonzalez et al. |
| 2002/0029349 | A1 | 3/2002 | Daigneault et al. |
| 2002/0099616 | A1 | 7/2002 | Sweldens |
| 2002/0129358 | A1 | 9/2002 | Buehl et al. |
| 2003/0172170 | A1 | 9/2003 | Johnson et al. |
| 2003/0191841 | A1 | 10/2003 | DeFerranti et al. |
| 2004/0098468 | A1 | 5/2004 | Kang |
| 2005/0231080 | A1 * | 10/2005 | Torrance .................... 312/223.6 |
| 2007/0005954 | A1 | 1/2007 | Skemer |
| 2008/0174217 | A1 * | 7/2008 | Walker .................... 312/329 |
| 2009/0267466 | A1 * | 10/2009 | Zook et al. .................. 312/223.6 |

OTHER PUBLICATIONS

"Netra t I Systems LOMlite User's Guide," Sun Microsystems, Inc., Part No. 806-2038-10, Revision A, Jul. 1999, pp. 1-8.

"Oracle Financial Applications," Rochester Institute of Technology, vol. 1, Issue 7, Mar. 2001, pp. 1-7.

"Sun Enterprise™ 420R Server Owner's Guide," Sun Microsystems, Inc., Part No. 806-1078-10, Revision A, Oct. 1999, pp. 1-174.

Notice of Allowance for U.S. Appl. No. 09/650,218 (issued as 6,976,269) mailed Aug. 29, 2005, 11 pages U.S. Patent and Trademark Office, Alexandria, Virginia USA.

Non-Final Office Action for U.S. Appl. No. 09/650,218 (issued as 6,976,269) mailed Mar. 9, 2005, 14 pages. U.S. Patent and Trademark Office, Alexandria, Virginia, USA.

Non-Final Office Action for U.S. Appl. No. 09/650,218 (issued as 6,976,269) mailed Apr. 27, 2004, 15 pages. U.S. Patent and Trademark Office, Alexandria, Virginia, USA.

Final Office Action for U.S. Appl. No. 09/650,218 (issued as 6,976,269) mailed Nov. 3, 2004, 15 pages. U.S. Patent and Trademark Office, Alexandria, Virginia, USA.

Notice of Allowance for U.S. Appl. No. 09/895,353 (issued as 6,971,029) mailed Aug. 18, 2005, 6 pages. U.S. Patent and Trademark Office, Alexandria, Virginia, USA.

Non-Final Office Action for U.S. Appl. No. 09/895,353 (issued as 6,971,029) mailed Jan. 19, 2005, 11 pages. U.S. Patent and Trademark Office, Alexandria, Virginia, USA.

Notice of Allowance for U.S. Appl. No. 10/162,313 (issued as 7,577,154) mailed Apr. 13, 2009, 13 pages U.S. Patent and Trademark Office, Alexandria, Virginia, USA.

Non-Final Office Action for U.S. Appl. No. 10/162,313 (issued as 7,577,154) mailed Apr. 23, 2008, 8 pages U.S. Patent and Trademark Office, Alexandria, Virginia, USA.

Non-Final Office Action for U.S. Appl. No. 10/162,313 (issued as 7,577,154) mailed Oct. 30, 2007, 10 pages. U.S. Patent and Trademark Office, Alexandria, Virginia, USA.

Non-Final Office Action for U.S. Appl. No. 10/162,313 (issued as 7,577,154) mailed Dec. 13, 2006, 8 pages. U.S. Patent and Trademark Office, Alexandria, Virginia, USA.

Final Office Action for U.S. Appl. No. 10/162,313 (issued as 7,577,154) mailed May 25, 2007, 9 pages. U.S. Patent and Trademark Office, Alexandria, Virginia, USA.

\* cited by examiner

A demarcation point cabinet may be placed into a non-moving, stationary portion of the cage mesh panel design near a biometric security reader that allows access to the cage mesh enclosure. The demarcation point cabinet can be placed above or below the biometric security reader to allow a consistency to be achieved because then the location of the demarcation point cabinet is generally known.
400

The demarcation point cabinet has both a front side and a back side without walls. Access to a back side of the cabinet is open to the cage side such that customers can install their wiring into the cabinet.
402

The demarcation point cabinet may have a secure locked door on the aisle side or corridor but be open on the cage access side.
404

The demarcation point cabinet may include a cable patch panel, which allows a customer's wiring from their network on one side to connect over to the communication facility structure's wiring to connect on the other side, which then either directly or in-directly via the communication facilities' wiring and equipment, connects to a third party providers public or private network.
406

A semi transparent wall structure may be installed around the cable patch panel that forms a physical tampering and access barrier from a front side of the cable patch panel to the back side of the cable patch panel.
408

A remote power panel can be located in the non-moving, stationary portion of the cage mesh near the demarcation point cabinet, wherein the close proximity of the remote power panel and the demarcation point cabinet provides for shorter cable runs from overhead cable trays in a facility side hallway to the demarcation point.
410

Figure 4

SYSTEMS AND METHODS FOR DMARC IN A CAGE MESH DESIGN

RELATED APPLICATIONS

This application claims the benefit of U.S. Provisional Patent Application Ser. No. 61/345,445, filed May 17, 2010 and entitled "A DMARC IN A CAGE MESH DESIGN."

FIELD OF THE INVENTION

Embodiments of the invention generally relate to processes and apparatus to provide network interoperability or network connectivity.

More particularly, an aspect of an embodiment of the invention relates to demarcation unit placement relative to a cage mesh.

BACKGROUND OF THE INVENTION

A co-location centre may be a type of data centre where multiple customers locate network, server and storage gear and interconnect to a variety of telecommunications and other network service provider(s) with a minimum of cost and complexity. Data centers may be shared by the multiple customers. With IT and communications facilities in safe, secure hands, telecommunications, internet, ASP and content providers, as well as enterprises, enjoy less latency and the freedom to focus on their core business. Additionally, customers reduce their traffic back-haul costs and free up their internal networks for other uses. Moreover, by outsourcing network traffic to a co-location service provider with greater bandwidth capacity, web site access speeds should improve considerably.

SUMMARY OF THE INVENTION

Various methods and apparatus are described for a demarcation point placed into a cage mesh panel design for a structure to provide network connectivity between networks. The demarcation point can comprise a demarcation point cabinet placed in the non-moving, stationary portion of a cage mesh panel design. The demarcation point cabinet provides network connectivity between networks and may be placed into a cage mesh panel for a communication facility structure. Such cage meshes may be used in a communication facility structure such as an Internet Exchange (IX), Peering Point, Data Center, or Co-location center. In this way, some embodiments can provide security to the customers using the communication facility structure, free up square footage space inside the cage for customers to put their own equipment and wiring and add security. For example, in some embodiments, a demarcation point cabinet may be constructed to prevent physical tampering or access from a front side of the demarcation point cabinet to the back side of the demarcation point cabinet.

Some example systems can include a communication facility structure that can be configured to provide network connectivity between public networks, private networks, or a combination of public and private networks. Some example systems may further comprise a structure, e.g., a semi transparent wall structure, around a cable patch panels that forms a physical tampering and access barrier from the front side of the cable patch panel to the back side of the cable patch panel.

BRIEF DESCRIPTION OF THE DRAWINGS

FIG. 4 illustrates a flow diagram of an example method for a demarcation mesh design.

Figure 1A:
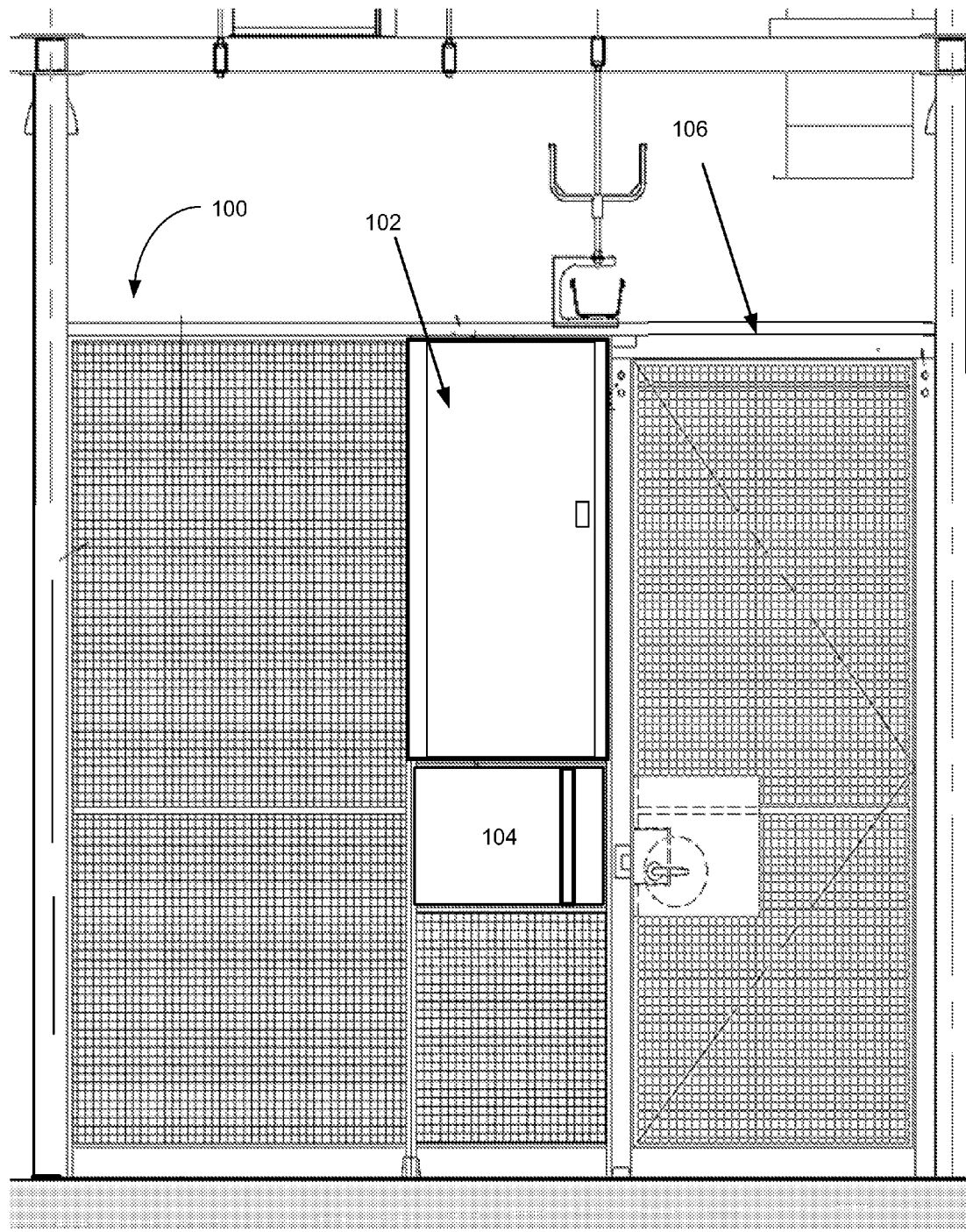
FIGS. 1A-C illustrates an example embodiment of a cage mesh.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of carrier lines, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first private carrier may be made. However, the specific numeric reference should not be interpreted as a literal sequential order but rather interpreted that the first private carrier is different than a second private carrier. Thus, the specific details set forth are merely exemplary. The specific details may be varied from and still be contemplated to be within the spirit and scope of the present invention.

In general, an example demarcation point (Dmarc) cabinet to provide network connectivity between networks, may be placed into the cage mesh panel design for a communication facility structure such as an Internet Exchange (IX), Peering Point, Data Center, and/or Co-location center. This can give security to the customers using these systems, methods, and apparatus and free-up space inside the cage.

Some cage mesh enclosures may include a plurality of cage mesh panels. One of the cage mesh panels can include a demarcation point, which can provide network connectivity. The demarcation point can be a demarcation point cabinet. This cabinet can be placed in a non-moving, stationary portion of the cage mesh enclosure. Additionally, the interior of the cage mesh enclosure provides security to the customer's network components using the communication facility structure that includes the cage mesh enclosures, e.g., using physical barriers.

For example, the demarcation point panel in the cage mesh enclosure can add security by preventing physical tampering or access from the front side of the demarcation point cabinet to the back side of the demarcation point cabinet. In some embodiments, the demarcation point cabinet can have both a front side and a back side without walls for easy access to connect cabling to a cable patch panel. The cage mesh structure and an internal tamper barrier inside the demarcation point cabinet can combine to isolate access from the hallway to the customer area and thereby ensure high security preventing unauthorized personnel from having access to the easily installable cabling.

Figure 1B:
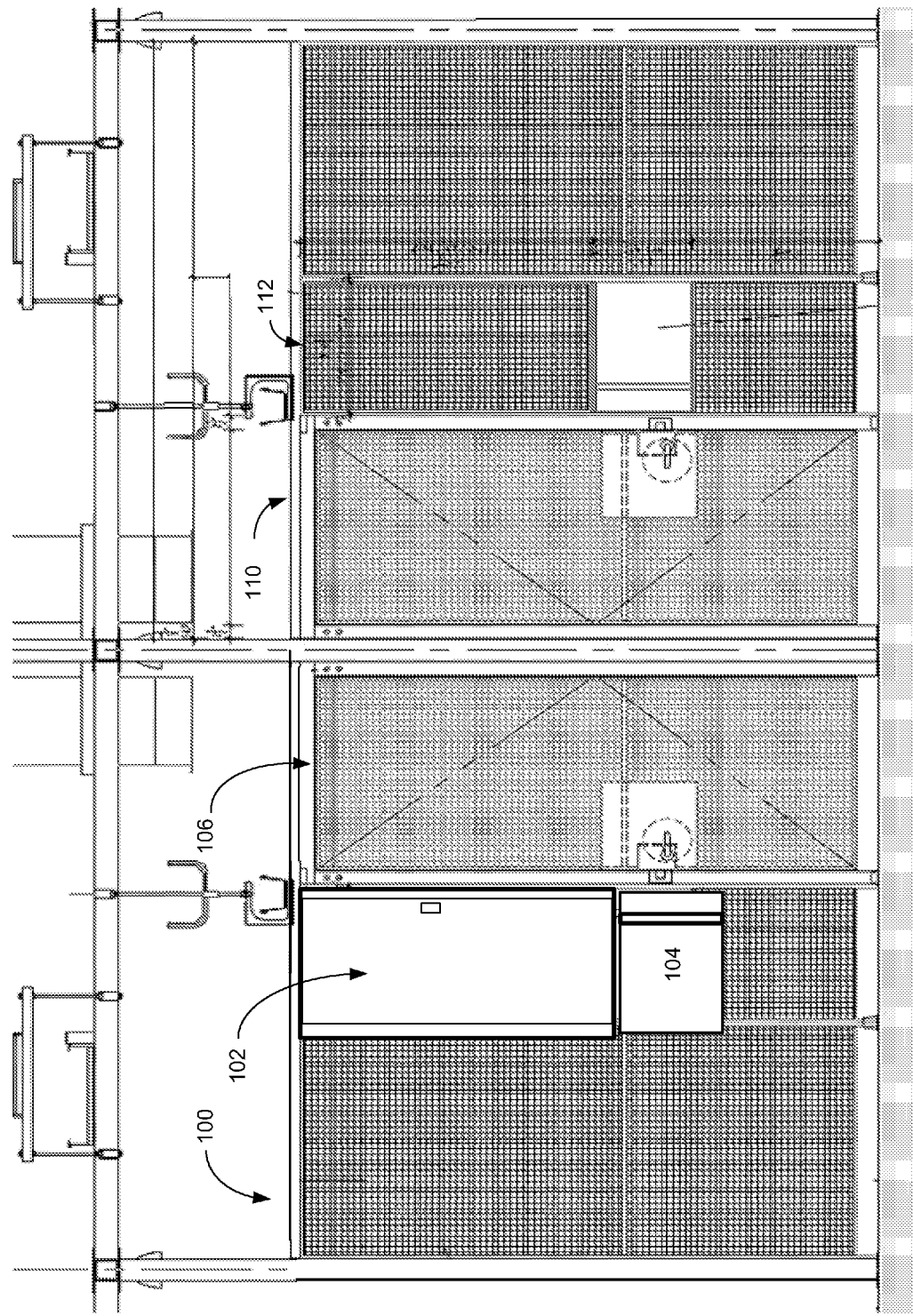
Figure 1C:
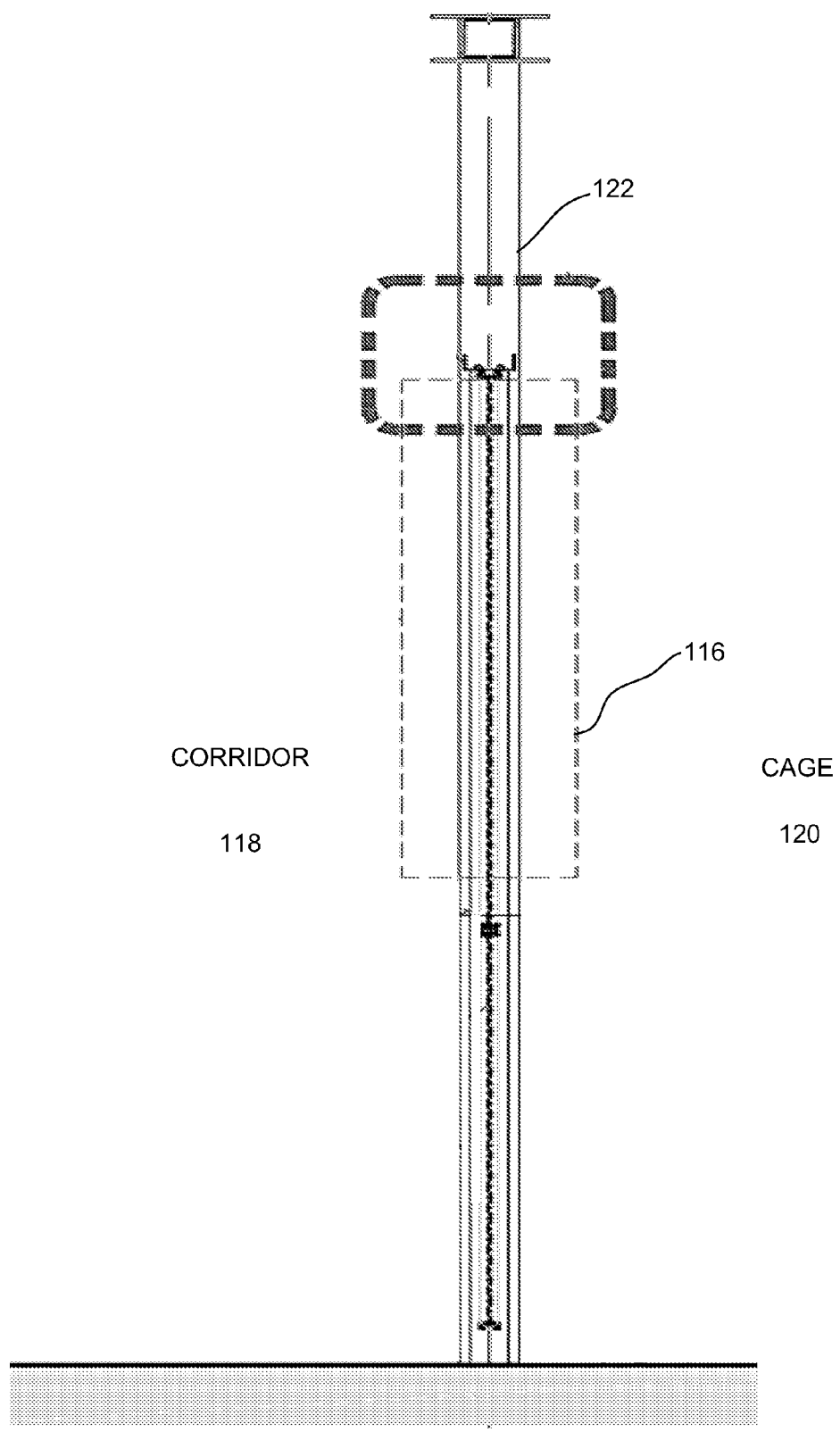
Figure 2:
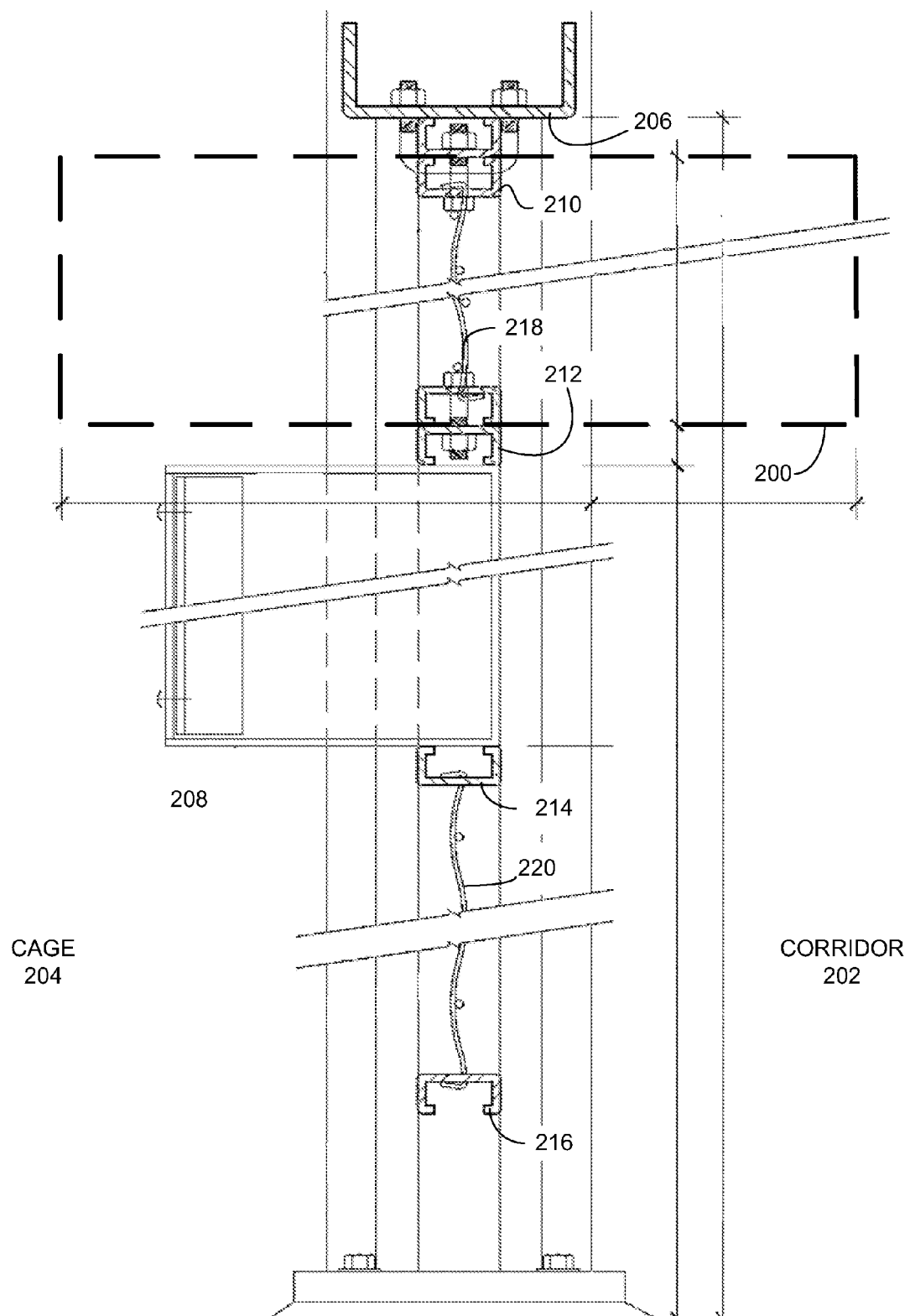
FIG. 2 illustrates further details of an example embodiment of a cage mesh.

The following drawings and text describe various example implementations of the design. FIGS. 1A-C illustrates the cage floor plan with the demarcation point cabinet. FIG. 2 illustrates some additional example cage details.

In the telephony and enterprise space, the demarcation point may be the point at which the telephone company's or other communications company's network ends and connects with the wiring at the customer location. A demarcation point is also referred to as the demarc, DMARC, MPOE (minimum point of entry or main point of entry). Another demarcation point is the network interface device (NID).

In some embodiments, the cage mesh enclosure houses the customer's networking communication equipment and wiring. A demarcation point cabinet may include a cable patch panel, which allows a customer's wiring from their network on one side to connect over to the communication facility structure's wiring to connect on the other side, which then either directly or in-directly via the communication facilities' wiring and equipment, connects to a third party providers public or private network. (See e.g., step 406 in FIG. 4.) For example, a customer's wiring might connect on a back side of the demarcation point cabinet. Additionally, a communication facility structure, such as a Co-location center, may allow a customer's network to connect to one or more Internet Service Providers' networks via a cross-connect.

Referring now to FIGS. 1A-C, an example cage 100 is illustrated. FIG. 1A illustrates portions of cage 100 near a demarcation point cabinet 102. The demarcation point cabinet 102 may be placed into a non-moving, stationary portion of a cage 100 mesh panel design near a biometric security reader 104. For example, the demarcation point cabinet 102 may be placed above or below a biometric security reader 104 that controls one or more locking mechanisms which may lock to prevent access or be opened to allow access to the cage mesh enclosure 100. This can allow a consistency to be achieved because then the demarcation point cabinet is always easily findable. By locating the demarcation point cabinet 102 in the stationary portion of the cage mesh 100 near the biometric security reader 104 a consistency is achieved. This is because the demarcation point cabinet 102 is generally always easily findable, which makes making cable connections faster because 1) familiarity of making a connection does not differ much from one geographic location to another and 2) a design area of access exists on the front side and back side of the cage mesh structure 100.

In some embodiments, demarcation point cabinet 102 can have both a front side and a back side without walls for easy access to connect cabling to a cable patch panel. The cage mesh structure and an internal tamper barrier inside the demarcation point cabinet 102 can combine to isolate access from the hallway to the customer area and thereby ensure high security preventing unauthorized personnel from having access to the easily installable cabling.

The demarcation point cabinet 102 may be attached to a structural channel support that also attaches to a door and helps hold the cage mesh in place. The channel may have one or more adjustable bracket supports built in to help hold in the demarcation point cabinet in place when secured. The brackets may attach to the demarcation point cabinet via compression or other mechanism. The demarcation point cabinet 102 can be placed into the non-moving, stationary portion of the cage mesh panel design near a biometric security reader 104 attached to the channel. Note, the biometric security reader 104 can control one or more locking mechanisms to allow access the cage mesh 100 enclosure.

FIG. 1B illustrates further details of one embodiment, including a cage mesh 110 having a design area 112 in the cage mesh 110 structure that is removable, forming a removable portion of a panel, such that a site team can remove the area in the future, insert the demarcation panel, and secure it to the cage mesh 110 frames. In addition, by placing the design area in the cage mesh 110 design, then no need exists to provide the space for the demarcation point inside the cage 110. A design area in the cage mesh 110 being the location and housing for a demarcation point such as a network interface device may provide security to the customers using this facility. This can be particularly important for financial customers. Local and third party staff members do not need to enter the customer cages; rather, the staff can do a cross connect in the aisle. The Network Interoperability and Tracking platform is an IP connectivity solution that provides direct access via an online portal to the private networks and private carriers and can use the patch panel of the demarcation point cabinet 102.

Additionally, when the demarcation point cabinet 102 is made to a standard size and the removable portion of a panel 112 matches the dimensions of the standard size of the demarcation point cabinet 102, just the removable portion of the panel needs to be removed without having additional portions of the panel removed. This results in enhanced security. Thus, no access can be gained through the demarcation point cabinet 102 when installed in the designed area or removal panel section. A cage 100 or 110 offers a customer an additional level of security and demarcation on a shared Data Centre floor. The customer can lock their cage 100 and isolate their equipment from other customers, while at the same time benefiting from the cost saving of a shared technical environment. Co-location data center installations may each have cages 100 on a shared co-location floor. The customers rely on the carrier to furnish cages 100 and suites that meet their requirements for physical security and power usage.

In some embodiments, a cage 100 or 110 can include woven wire mesh screen with lockable sliding door(s) and customizable space dimensions. Two example types of cages include Private Cages and Shared Cages. The cage door 106 may have the panel channel and match the width of a standard panel. The demarcation point unit may be built into the cage mesh 100.

Private and shared cages may be configured with cable distribution systems, dual AC and DC power distribution raceways, and anonymous cabinets (individually locked if necessary). Private and shared suites might also be available at select locations providing a customized area that may be fully enclosed with solid partitions.

Generally, all shared and private cage/suite areas might be equipped with security cameras, biometric hand geometry readers, and individually locked cabinets (upon request). Cage/Suite access histories and configurations can be compiled and may be available for audit.

The demarcation point cabinet may have walls on its sides and may be open on an aisle side and also open on a cage access side to allow easy wiring connections on both sides. Thus, a front side of the demarcation point cabinet is accessible from a hallway of a facility rather than inside a cage mesh structure to provide access on a front hallway side of the cabinet to connect cabling to the facility. Likewise, access to a back side of the cabinet is open to the cage side such that customers can install their wiring into the cabinet. (See e.g., step 402 in FIG. 4.) Accordingly, the demarcation point cabinet has both a front side and a back side without walls. (See e.g., step 402 in FIG. 4.) The lack of walls provides access to connect cabling to a cable patch panel. The cage mesh structure and an internal tamper barrier inside the demarcation point cabinet combine to isolate access from a hallway to a customer area inside the cage and thereby, ensure high security preventing unauthorized personnel from having access but enable easy cabling installation. Note, placing the removable portion of a panel in the cage mesh enclosure eliminates a need to provide space for the demarcation point inside the cage, freeing up additional square footage for customer wiring and equipment.

High-power density cabinet configurations can be important to information-driven businesses with the increasing power requirements of today's technology. Customers may look to the service provider to configure cabinet and racking solutions that maximize their power usage and heat dissipation. In some embodiments, customers can pick standard cabinet offerings or can elect to use cabinets or racks of their choosing provided they meet certain specifications. Additionally, in some embodiments, a remote power panel can be located in the non-moving, stationary portion of the cage mesh structure 100. (See e.g., step 410 in FIG. 4.) This can be near the demarcation point cabinet 102, where the close proximity of the remote power panel and the demarcation point cabinet 102 provides for shorter cable runs from overhead cable trays in a facility side hallway to the demarcation point. (See e.g., step 410 in FIG. 4.)

FIG. 1C illustrates a side view of an example embodiment including a location 116 for a demarcation point cabinet. In some embodiments, the demarcation point cabinet may have a secure locked door (not shown) on the aisle side or corridor 118 but open on the cage access side 120. (See e.g., step 404 in FIG. 4.) In other embodiments, a cabinet may be open on the aisle side 118 and open on the cage access side 120 to allow for easy connections on both sides. In some examples, a Plexi-glass® panel around the cable patch panel of the demarcation point may be used to block access to one side from the other.

A demarcation cabinet can be attached to a structural channel support 122 that also attaches to a door and helps hold mesh of cage in place. Additionally, a bio-reader 104 can be attached to channel 122, which can have adjustable bracket supports built in to help hold in the cabinet(s). The brackets can attach to the cabinet via compression or mechanically with a nut and bolt or other fastening mechanisms.

In some embodiments, the communication facility structure's wiring might use a cross connect to connect the Internet Service Providers wiring to other customers wiring. Inside a Co-location facility, a cross connect is much more than a cable. A single cross connect can be a link to a dynamic ecosystem of business partners, content providers, networks, carriers and Internet service providers. From electronic trading systems, to peering relationships, cross connects ensure high-performance network reliability, redundancy and low-latency.

Electronic trading exchanges run hundreds of cross connects between servers inside our centers as they look to maximize the number of trades processed per second. Milliseconds of latency can cost traders millions of dollars. For electronic trading systems, enterprises, or content companies, a cross connect inside co-location center ensures high-performance network reliability, redundancy, and low-latency.

For content companies that run streaming video sites, a single cross connect can be the link to the major international carriers or ISPs who serve their users. Enterprises connect their most critical applications to multiple global networks for redundancy and pricing advantages.

Co-location Services deliver IP connectivity over a redundant Ethernet or other protocol platform to provide a fast, resilient and flexible service. By accessing multiple ISPs simultaneously, customers can establish a constant connection to the Internet for high performance access.

Placement of a demarcation point (Dmarc) cabinet to provide network connectivity between networks into the cage mesh panel design for a structures such as an Internet Exchange (IX), Peering Point, Data Center, and/or Co-location center may give security to the customers using the demarcation point and free-up space inside the cage. Core Interconnection & Secondary Co-location Space Overview Conclusion Interconnect Facilities may provide Access at the Transport Layer to Services therefore Carriers & Enterprises may extend their network demarcation point cabinet(s) to Interconnect Facilities.

Referring to FIG. 2, in some embodiments, a demarcation point cabinet 200 can be accessible from a hallway or corridor 202 of a facility rather than inside 204 a cage mesh structure. This can provide access on a front hallway side 200 of the cabinet to connect cabling to the facility as well as to provide access to the back side of the cabinet such that customers can install their wiring into the cabinet. The access on both sides also mitigates and decreases risk that a wrong cable may be disconnected, as well as results in faster maintenance times. This can increase overall uptime that a customer's network and its portion of equipment located inside the cage mesh is connected to the Internet. The demarcation point cabinet might be accessed on both sides of the security door. Access from the customer's cage mesh structure into the facility's secure hallways can provide local and third party staff members access without entering into a customer cage and wherein staff can do a cross connect in the aisle.

Similar to FIG. 1C, FIG. 2 illustrates a side view of an example embodiment including a location 200 for a demarcation point cabinet. A demarcation cabinet can be attached to a structural support 206. Additionally, a bio-reader 208 can be attached to support 206 which can have adjustable bracket supports 210, 212, 214, 216 built in to help hold in the cabinet(s). The brackets 210, 212, 214, 216 can attach to the cabinet via compression or mechanically with a nut and bolt or other fastening mechanisms 218, 220.

One or more cross-connects from the carrier through the demarcation point cabinet to the customer's network wiring may be installed. The cross connect can allow customers to directly connect to any other customer within the center or to the Exchange switching platform. Cross-connects may provide quick and direct access to business partners, content providers, ISPs, and carriers with a broad choice of speeds and media types. The cable management system forms a high-performance backbone for customers—a scalable architecture that can rapidly meet increasing customer demands.

This solution may also combine network-rich interconnection and secure co-location services by integrating Carrier Ethernet Exchange points into a world-class International Business Exchange™ (IBX®) data centers. The Network Interoperability and Tracking platform's neutrality may provide a wide choice for connectivity and inspire strategic customer interaction within this unique IBX environment where enterprises, Internet content and digital media companies can connect to over 360 networks worldwide. For example, the International Business Exchange™ (IBX®) centers are generally built to protect and connect the important information-driven operations of businesses worldwide. The Global Carrier Ethernet Exchange platform has a vast number of locations where Ethernet Service providers can interconnect and experience the benefits of the Ethernet Exchange.

In an embodiment, a Network Interoperability and Tracking platform delivers IP connectivity over an Ethernet platform with built in redundancy to provide a fast, resilient and flexible service. By accessing multiple private carriers simultaneously, customers can establish a continuous private connection amongst their office operations located in multiple geographically distinct locations including being located on different continents. Point to point connectivity can be established for these private networks across these multiple geographically distinct locations without leaving the framework of the company's private network. The Network Interoperability and Tracking platform sits in the middle of these private carriers with their private carrier lines already laid out in these different geographic locations and allows selection of one or more routes to take as well as provides transit service tracking for the data bandwidth being communicated. The portal interface of the Network Interoperability and Tracking platform can be configured to select specific private carriers for use of their private carrier lines and transit services from the selected private carrier providers.

This service enables companies to interconnect their networks to move data to destinations in an efficient and reliable manner. The Network Interoperability and Tracking platform facilitates interconnection and peering via an Ethernet central switching fabric. It will be used by many private companies operating within an exchange center, including: network service providers (such as ISPs, carriers, international PTTs and broadband networks), as well as content, e-commerce and enterprise companies delivering video, gaming, or other applications. For example, in some embodiments the communication facility structure can be configured to provide network connectivity between public networks, private networks, or a combination of public and private networks.

In some embodiments, a cage mesh enclosure may be located in a Co-location communication facility. Such a facility can include multiple panels in the cage mesh enclosure and a plurality of cage mesh enclosures in the Co-location communication facility. One of the cage mesh panels can include a demarcation point cabinet that provides network connectivity between a customer's network components and either private carrier or public carrier network components.

Figure 3:
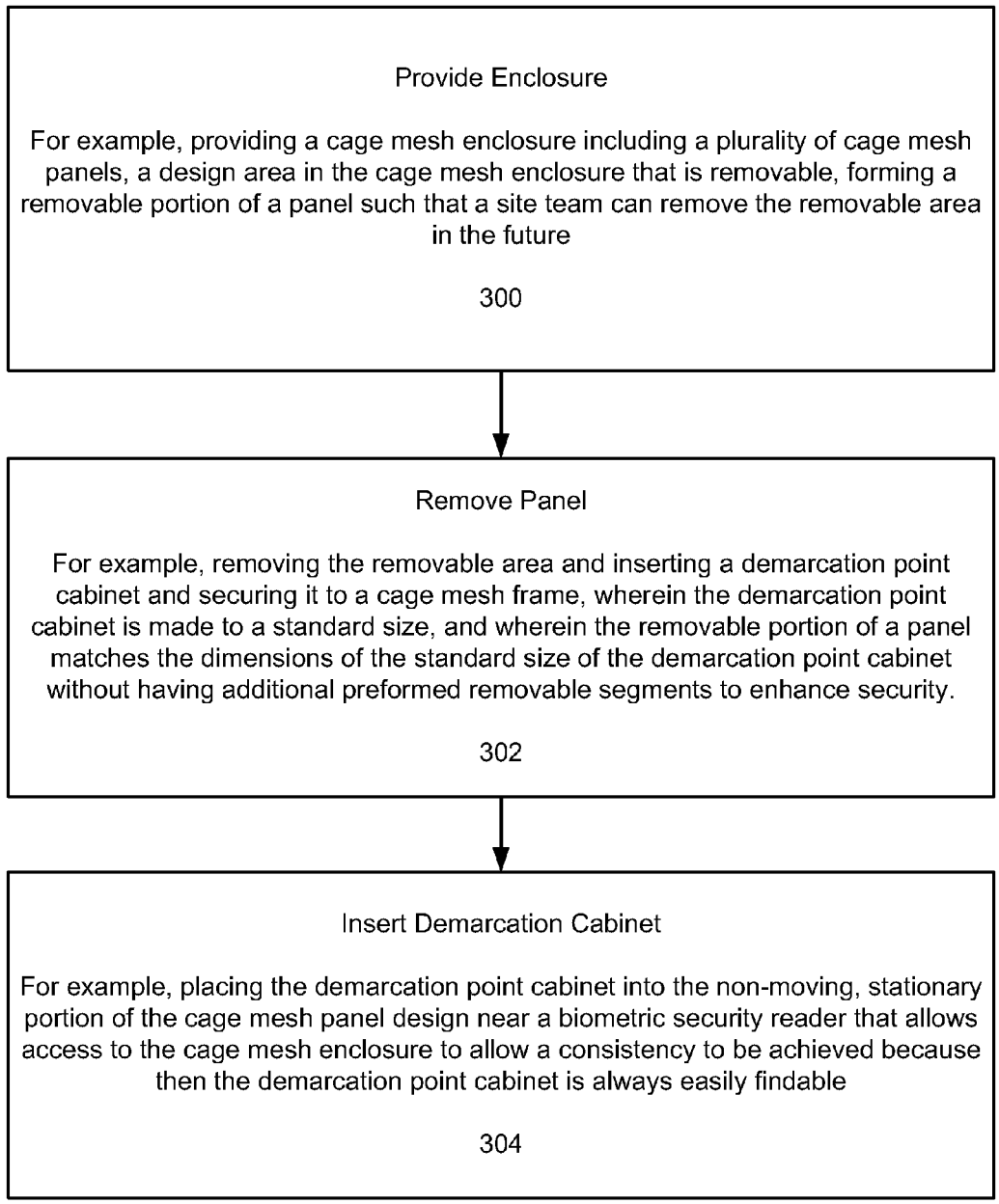
FIG. 3 illustrates a flow diagram of an example method for a demarcation mesh design.

FIG. 3 illustrates a flow diagram of an example method for a demarcation mesh design. In step 300 of the illustrated example, a cage mesh enclosure can be provided. The enclosure may include a plurality of cage mesh panels. Additionally, the cage mesh enclosure may include a design area in the cage mesh that is removable such that a site team can remove the removable area in the future.

In step 302, the removable area can be removed. In step 304, a demarcation point cabinet 102 can be inserted and it can be secured to a cage mesh frame. In some examples, the demarcation point cabinet 102 may be inserted or placed in the non-moving, stationary portion of the cage mesh enclosure. Additionally, the demarcation point cabinet 102 can be made to a standard size such that, the removable portion of a panel matches the dimensions of a standard size of the demarcation point cabinet 102 without having additional preformed removable segments to enhance security.

Using this example method, a cage mesh enclosure including a plurality of cage mesh panels with one of the cage mesh panels and a demarcation point can be provided. The demarcation point can include a demarcation point cabinet 102 that provides network connectivity. Additionally, such an apparatus can provide security to the customers using a communication facility structure including the cage mesh enclosure. For example, the cage mesh enclosure may add security by preventing physical tampering or access from a front side of the demarcation point cabinet 102 to the back side of the demarcation point cabinet 102. For example, some embodiments may include a structure, e.g., a semi transparent wall structure around a cable patch panel that form a physical tampering and access barrier from a front side of the cable patch panel to the back side of the cable patch panel. (See e.g., step 408 in FIG. 4.) The semi transparent wall structure may be made out of clear plastic, such as Plexiglas® or similar types of material and be located inside the demarcation point cabinet 102.

Such methods may provide for an additional level of security. For example, a cage offers a customer an additional level of security and demarcation on a shared Data Centre floor. The customer can lock their cage and isolate their equipment from other customers, while at the same time benefiting from the cost saving of a shared technical environment. Co-location data center installations may each have cages on a shared co-location floor.

In some embodiments, the demarcation point cabinet may be placed into the non-moving, stationary portion of the cage mesh panel design, e.g., near a biometric security reader that allows access to the cage mesh enclosure to allow a consistency to be achieved because then the demarcation point cabinet is always easily findable. (See e.g., step 400 in FIG. 4.) For example, the demarcation point cabinet can be placed above or below the biometric security reader to allow a consistency to be achieved because then the location of the demarcation point cabinet is generally known. (See e.g., step 400 in FIG. 4.) An example demarcation point including a demarcation point cabinet placed in a non-moving, stationary portion of the cage mesh enclosure can provide security to a customer's network components using the communication facility structure. For example, the demarcation point panel in the cage mesh enclosure may add security by preventing physical tampering or access from a front side of the demarcation point cabinet to a back side of the demarcation point cabinet.

In one embodiment, any software used, for example, in the bio-reader or routines run in the Demarcation point cabinet, to facilitate the protocol and algorithms associated with the process, can be embodied onto a machine-readable medium. A machine-readable medium includes any mechanism that provides (e.g., stores and/or transmits) information in a form readable by a machine (e.g., a computer). For example, a machine-readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. The information representing the apparatuses and/or methods stored on the machine-readable medium may be used in the process of creating the apparatuses and/or methods described herein. The software coding may be written in a software programming language such as C++ or another software language.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

While some specific embodiments of the invention have been shown the invention is not to be limited to these embodi-

What is claimed is:

1. An apparatus, comprising:
a demarcation point cabinet to provide network connectivity between networks arranged within a cage mesh panel design of a cage mesh structure of a communication facility structure, wherein the demarcation point cabinet is located in a non-moving, stationary portion of the cage mesh panel design for the communication facility structure, the communication facility structure including an Internet Exchange (IX), Peering Point, Data Center, or Co-location center, the demarcation point cabinet arranged within the cage mesh panel design such that a front side of the demarcation point cabinet is accessible for connection from outside the cage mesh structure while other equipment within the cage mesh structure remains inaccessible providing security to the other equipment and freeing up square footage space inside the cage for customers to put their own equipment and wiring, where the demarcation point cabinet is constructed with physical barriers to prevent physical tampering or access from the front side of the demarcation point cabinet to a back side of the demarcation point cabinet.

2. The apparatus of claim 1, where the communication facility structure is configured to provide network connectivity between public networks, private networks, and a combination of public and private networks, and the demarcation point cabinet further comprises an at least semi transparent wall structure around a cable patch panel that forms a physical tampering and access barrier from a front side of the cable patch panel to a back side of the cable patch panel.

3. The apparatus of claim 2, wherein the semi transparent wall structure comprises a structure made out of a clear plastic type of material located inside the demarcation point cabinet, and wherein a remote power panel is located in the non-moving, stationary portion of the cage mesh near the demarcation point cabinet, wherein the close proximity of the remote power panel and the demarcation point cabinet provides for cable runs from overhead cable trays in a facility side hallway to the demarcation point; and wherein the demarcation point cabinet is attached to a structural channel support mechanically using a fastening mechanism including a nut and a bolt.

4. The apparatus of claim 1, wherein the demarcation point cabinet is attached to a structural channel support that also attaches to a door and helps hold the cage mesh in place; wherein the channel has adjustable bracket supports built in to help hold in the cabinet; wherein the brackets attach to the cabinet via compression; and wherein the demarcation point cabinet is placed into the non-moving, stationary portion of the cage mesh panel design near a biometric security reader attached to the channel, wherein the biometric reader controls one or more locking mechanisms to access the cage mesh enclosure, and wherein the front side of the demarcation point cabinet is accessible from a hallway of the communication facility structure rather than inside the cage mesh structure to provide access on a front hallway side of the cabinet to connect cabling to the facility structure even when a back side of the cabinet is inaccessible, wherein the biometric reader controls access to the back side of the cabinet such that customers can install their wiring into the cabinet, and wherein access on both sides also mitigates and decreases risk that a wrong cable may be disconnected, as well as provides for faster times to perform maintenance, which increases overall uptime that a customer's network and its portion of equipment located inside the cage mesh structure is connected to the Internet.

5. The apparatus of claim 4, wherein the demarcation point cabinet is placed into the non-moving, stationary portion of the cage mesh panel design above the biometric security reader to allow a consistency to be achieved because then the demarcation point cabinet is always easily findable; and wherein the cabinet includes a secure locked door on an aisle side and is open on a cage access side.

6. The apparatus of claim 4, wherein the demarcation point cabinet is placed into the non-moving, stationary portion of the cage mesh panel design below the biometric security reader to allow a consistency to be achieved because then the demarcation point cabinet is always easily findable; wherein the demarcation point cabinet has walls on its sides and is open on an aisle side and is open on a cage access side to allow easy connections on both sides.

7. The apparatus of claim 1, further comprising:
a designed area in the cage mesh structure that is removable, forming a removable portion of a panel, such that a site team can remove the removable area in the future and insert the demarcation point cabinet and secure it to a cage mesh frame, wherein when the demarcation point cabinet is made to a standardized size and the removable portion of the panel matches the dimensions of the standardized size of the demarcation point cabinet, just the removable portion of the panel needs to be removed without having additional portions of the panel removed and without requiring additional preformed removable segments to account for different sized demarcation point cabinets, where the lack of removing additional removable segments enhances security of the cage mesh enclosure; and
the demarcation point cabinet is mechanically secured to a channel using a fastening mechanism.

8. The apparatus of claim 1, wherein access to the demarcation point cabinet is provided on both sides of a security door and wherein limited access to the cage mesh structure from a hallway of the communication facility structure provides local and third party staff members access without entry into the cage mesh structure and wherein staff can do a cross connect in the hallway; and
wherein the front side of the demarcation point cabinet has a secure locked door on the aisle side but the back side is open for access when in the cage mesh structure.

9. The apparatus of claim 1, wherein the front side and a back side of the demarcation point cabinet are without walls, the lack of walls providing access to connect cabling to a cable patch panel and wherein a cage mesh structure and an internal tamper barrier inside the demarcation point cabinet combine to prevent access from a hallway to a customer area inside the cage mesh; and thereby, ensure high security preventing unauthorized personnel from having access but enabling easy cabling installation, and wherein placing a removable portion of a panel in a cage mesh design eliminates a need to provide space for the demarcation point inside the cage, freeing up additional square footage for customer wiring and equipment.

10. A cage mesh enclosure in a Co-location communication facility comprising:
a plurality of panels in the cage mesh enclosure;
a demarcation point cabinet that provides network connectivity between a customer's network components and either private carrier or public carrier network components, wherein the demarcation point cabinet is placed in a non-moving, stationary portion of a first panel of the cage mesh enclosure and is arranged within the cage mesh enclosure such that a front side of the demarcation point cabinet is accessible for connection from outside the cage mesh enclosure while a customer's other network components within the cage mesh enclosure remain inaccessible providing security to the customer's network components within the communication facility structure and wherein the demarcation point cabinet in the cage mesh enclosure prevents physical tampering or access from a front side of the demarcation point cabinet to a back side of the demarcation point cabinet.

11. The cage mesh enclosure of claim 10, wherein the demarcation point panel is configured to provide network connectivity between public networks, private networks, and a combination of public and private networks, and further comprising an at least semi transparent structure around a cable patch panel that combine to form a physical tampering or access barrier from a front side of a cable patch panel to a back side of the cable patch panel.

12. The cage mesh enclosure of claim 11, wherein the semi transparent wall structure comprises a structure made out of a clear plastic type of material located inside the demarcation point cabinet, and wherein a remote power panel is located in the non-moving, stationary portion of a cage mesh panel design of the cage mesh enclosure near the demarcation point cabinet, wherein the close proximity of the remote power panel and the demarcation point cabinet provides for cable runs from overhead cable trays in a facility side hallway to the demarcation point.

13. The cage mesh enclosure of claim 10, wherein the demarcation point cabinet is placed into the non-moving, stationary portion of a cage mesh panel design of the cage mesh enclosure near a biometric security reader that controls one or more locking mechanisms to access the cage mesh enclosure, and wherein the demarcation point cabinet is accessible from a hallway of the facility rather than inside the cage mesh enclosure to provide access on a front hallway side of the cabinet to connect cabling to the facility even when a back side of the cabinet is inaccessible, wherein the biometric security reader controls access to the back side of the cabinet such that customers can install their wiring into the cabinet, and wherein the access on both sides also mitigates and decreases risk that a wrong cable may be disconnected, as well as faster times to perform maintenance, which increases overall uptime that a customer's network and its portion of equipment located inside the cage mesh enclosure is connected to the Internet.

14. The cage mesh enclosure of claim 10, further comprising:
a designed area in the cage mesh structure that is removable, forming a removable portion of a panel, such that a site team can remove the removable area in the future and insert the demarcation point cabinet and secure it to a cage mesh frame, wherein the demarcation point cabinet is made to a standardized size, and wherein the removable portion of a panel matches the dimensions of the standardized size of the demarcation point cabinet without having additional preformed removable segments to enhance security.

15. The cage mesh enclosure of claim 10, wherein access to the demarcation point cabinet is provided on both sides of a security door and wherein limited access to the customer's cage mesh enclosure from a hallway of the facility provides local and third party staff members access without entry into the customer's cage mesh enclosure and wherein staff can do a cross connect in the hallway.

16. The cage mesh enclosure of claim 10, wherein the front side and a back side of the demarcation point cabinet are without walls, the lack of walls providing access to connect cabling to a cable patch panel and wherein a cage mesh structure and an internal tamper barrier inside the demarcation point cabinet combine to prevent access from a hallway to a customer area and thereby ensure high security preventing unauthorized personnel from having access to easily installable cabling.

17. A method of performing network connectivity comprising:
providing a cage mesh enclosure including a plurality of cage mesh panels arranged in a cage mesh panel design, a removable area in the cage mesh enclosure, forming a removable portion of a panel, such that a site team can remove the removable area in the future; and
removing the removable area and inserting a demarcation point cabinet and securing it to a cage mesh frame, wherein the demarcation point cabinet is made to a standardized size, and wherein the removable portion of the panel matches the dimensions of the standardized size of the demarcation point cabinet without having to remove additional preformed removable segments to enhance security, the demarcation point cabinet secured within the cage mesh enclosure such that a front side of the demarcation point cabinet is accessible for connection from outside the cage mesh enclosure while other equipment within the cage mesh enclosure remains inaccessible.

18. The method of claim 17, further comprising placing the demarcation point cabinet into a non-moving, stationary portion of the cage mesh panel design near a biometric security reader that allows access to the cage mesh enclosure to allow a consistency to be achieved because then the demarcation point cabinet is always easily findable.

19. The method of claim 18, wherein the demarcation point cabinet is placed into the non-moving, stationary portion of the cage mesh panel design above the biometric security reader to allow a consistency to be achieved because then the demarcation point cabinet is always easily findable.

20. The method of claim 18, wherein the demarcation point cabinet is placed into the non-moving, stationary portion of the cage mesh panel design below the biometric security reader to allow a consistency to be achieved because then the demarcation point cabinet is always easily findable.

* * * * *